United States Patent
Olson

(10) Patent No.: US 11,569,901 B2
(45) Date of Patent: *Jan. 31, 2023

(54) SYSTEM FOR EMPLOYING CELLULAR TELEPHONE NETWORKS TO OPERATE, CONTROL AND COMMUNICATE WITH UNMANNDED AERIAL VEHICLES AND REMOTE PILOTED VEHICLES

(71) Applicant: Rhombus Systems Group, Inc., Philadelphia, PA (US)

(72) Inventor: Erlend Olson, Albuquerque, NM (US)

(73) Assignee: Rhombus Systems Group, Inc., Philadelphia, PA (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/151,350

(22) Filed: Jan. 18, 2021

(65) Prior Publication Data

US 2021/0391918 A1    Dec. 16, 2021

Related U.S. Application Data

(63) Continuation of application No. 15/906,540, filed on Feb. 27, 2018, now Pat. No. 10,897,304, which is a
(Continued)

(51) Int. Cl.
*H04W 4/42* (2018.01)
*H04B 7/185* (2006.01)
(Continued)

(52) U.S. Cl.
CPC ..... *H04B 7/18508* (2013.01); *H04B 7/18504* (2013.01); *H04B 7/18506* (2013.01);
(Continued)

(58) Field of Classification Search
CPC ............... H01Q 1/246; H04B 7/18504; H04B 7/18506; H04B 7/18534; H04L 69/18;
(Continued)

(56) References Cited

U.S. PATENT DOCUMENTS

| 5,499,295 | A | 3/1996 | Cooper |
| 6,058,478 | A | 5/2000 | Davis |

(Continued)

FOREIGN PATENT DOCUMENTS

| CN | 101176367 | 5/2008 |
| JP | 2005535201 | 11/2005 |

(Continued)

*Primary Examiner* — Lester G Kincaid
*Assistant Examiner* — Dung L Lam
(74) *Attorney, Agent, or Firm* — Bonini IP Law, LLC; Frank J. Bonini, Jr.

(57) ABSTRACT

A cellular type communications system for cellular telephone networks to operate, control and communicate with unmanned aerial vehicles and remote piloted vehicles, the system including a first near-ground region to communicate with devices near the ground, as well as one or more layers covering roughly the same areal extent as the ground region but which are separated from each other and also elevated above ground substantially, and within which an aerial vehicle may rely on communications using the cell-based communications network.

22 Claims, 7 Drawing Sheets

SYSTEM FOR COMMUNICATING WITH UAVs and RPVs

Related U.S. Application Data continuation of application No. PCT/US2016/050166, filed on Sep. 2, 2016.

(60) Provisional application No. 62/214,053, filed on Sep. 3, 2015.

(51) Int. Cl.
| | | |
|---|---|---|
| *H04W 16/30* | (2009.01) | |
| *H04W 16/28* | (2009.01) | |
| *H04W 4/46* | (2018.01) | |
| *H04W 4/021* | (2018.01) | |
| *H01Q 1/24* | (2006.01) | |
| *H04L 69/18* | (2022.01) | |

(52) U.S. Cl.
CPC .......... *H04B 7/18534* (2013.01); *H04W 4/42* (2018.02); *H04W 16/28* (2013.01); *H04W 16/30* (2013.01); *H01Q 1/246* (2013.01); *H04L 69/18* (2013.01); *H04W 4/021* (2013.01); *H04W 4/46* (2018.02)

(58) Field of Classification Search
CPC ..... H04W 16/00; H04W 16/24; H04W 16/28; H04W 16/30; H04W 4/046; H04W 4/42
See application file for complete search history.

(56) References Cited

U.S. PATENT DOCUMENTS

| | | |
|---|---|---|
| 7,836,299 B2 | 11/2010 | England et al. |
| 7,908,483 B2 | 3/2011 | Iliev et al. |
| 8,375,221 B1 | 2/2013 | Thom et al. |
| 8,787,904 B1 | 7/2014 | Hayes |
| 8,838,289 B2 | 9/2014 | Margolin |
| 8,924,044 B1 | 12/2014 | Wang |
| 9,266,610 B2 | 2/2016 | Knapp |
| 9,540,121 B2 | 1/2017 | Byers |
| 9,542,850 B2 | 1/2017 | Kantor |
| 9,547,985 B2 | 1/2017 | Tuukanen |
| 9,621,254 B2 | 4/2017 | Chang |
| 9,681,320 B2 | 6/2017 | Johnson |
| 9,874,874 B2 | 1/2018 | Bernhardt |
| 10,025,303 B1 | 7/2018 | Annan |
| 2006/0040660 A1 | 2/2006 | Cruz et al. |
| 2006/0229070 A1 | 10/2006 | de La Chapelle |
| 2006/0264242 A1 | 11/2006 | Dent |
| 2008/0102814 A1* | 5/2008 | Chari ................. H04B 7/18506 455/424 |
| 2011/0212695 A1* | 9/2011 | Wild .................... H04B 7/0617 455/73 |
| 2014/0233412 A1 | 8/2014 | Mishra |
| 2014/0241239 A1 | 8/2014 | Chang |
| 2015/0147976 A1 | 5/2015 | Wang |
| 2015/0171956 A1 | 6/2015 | Wang |
| 2015/0236778 A1* | 8/2015 | Jalali ................. H04B 7/18541 370/316 |
| 2016/0050011 A1 | 2/2016 | Frolov |
| 2016/0105233 A1 | 4/2016 | Jalali |

FOREIGN PATENT DOCUMENTS

| | | |
|---|---|---|
| JP | 2012502527 | 1/2012 |
| WO | 2004014095 | 2/2004 |
| WO | 2010025997 | 3/2010 |

* cited by examiner

PRIOR ART – TYPICAL UAV

PRIOR ART – TYPICAL RPV

PRIOR ART – TYPICAL UAV/RPV MILITARY COMMUNICATION NETWORK

PRIOR ART – TYPICAL RPV SATELLITE COMMUNICATIONS ANTENNA

SYSTEM FOR COMMUNICATING WITH UAVs and RPVs

SYSTEM FOR EMPLOYING CELLULAR TELEPHONE NETWORKS TO OPERATE, CONTROL AND COMMUNICATE WITH UNMANNDED AERIAL VEHICLES AND REMOTE PILOTED VEHICLES

BACKGROUND OF THE INVENTION

1. Field of the Invention

The invention relates to the field of wireless communications, and more particularly to systems, methods and components for operation of cellular telephone networks in connection with unmanned and remotely piloted aerial vehicles.

2. Brief Description of the Related Art

Wireless systems for general public communications used today are often "cell" based, as illustrated in the diagram of FIG. 1. In such systems, mobile phones or mobile devices (100) within a larger geographic region (101) are served by a distribution of fixed location local radio transceivers which provide two way wireless communications to the devices in sub-regions of the larger region (102). When the mobile phone or mobile device moves from one location to a new location (103), it may be served by a different local fixed radio transceiver in the cellular wireless system (104), or by a different sector (104a, 104b, 104c) within the range of the same local fixed radio transceiver.

The antenna radiation patterns of the fixed radio transceivers in the wireless system typically are oriented to be directionally along ground, as opposed to omni-directionally or skyward. Some reasons for such limited radiation patterns include firstly that users of wireless devices in such system are limited to being almost always physically along the surface of the earth, as wireless cell phone and smartphone communications whilst in a commercial airplane are generally forbidden by law, and secondly that cellular based communications systems avoid interference between cells which repeat use of frequencies, by limiting the radiated power that may enter adjacent or nearby cells, which is effectuated at least in part by controlling of the radiation pattern which emanates from the antenna associated with the fixed radio transceiver. A simplified diagram of the radiation pattern of a typical fixed radio transceiver in a cellular-based wireless communications system appears in FIG. 2. The horizontal or 'parallel to ground plane' pattern is indicated in (200) while the vertical pattern is indicated in (210).

Referring further to the pictorial diagram in FIG. 3, the vertical pattern can be further visualized. The fixed cellular radio transceiver antenna system (300) is typically mounted on a mast some distance above the ground (304) and designed to enable communications with mobile devices within some range radially from the antenna (303) by covering that area with a so-called beam (301) of specific frequencies which are used to transceive datagrams or voice traffic between a mobile device (not shown) and a cellular based communications system via the fixed antenna (300). The beam is typically designed to subtend a useful angle of 5 to 10 degrees (302) and may as well be tilted towards the ground by an additional 5 to 10 degrees (305). So-called vertical side-lobes which point towards the ground in fact assist in supplying coverage to mobile devices nearer to the antenna (306a) whilst vertical side lobes that point skyward (306b) are of typically of no use or consequence, and are ignored as byproducts of the antenna system.

Referring to FIG. 4, (400a) there is shown a simplification diagram of the fixed radio transceiver antenna indicated in FIG. 3, where each antenna (401, 402) is mounted up above the ground (410) and has a vertical radiation pattern substantially along ground (401a, 401b, 402a, 402b), and where the fixed radio transceivers are spaced according to some plan as might be in a typical cellular-type communications network in order to insure continuity of coverage. As is well understood by those practiced in the art, the actual spacing of the fixed radio transceivers is performed in 2 dimensions across the surface of a region to be covered, and a frequency re-use pattern is established such that the frequencies radiated from one fixed radio transceiver (401b) towards another (402a) are different, avoiding interference between adjacent locations. That is, the frequencies for communications associated with beam (401b) might be from frequency group $f_A$, whereas those associated with beam (402a) might be from frequency group $f_B$ and so on. Cellular-based communications system frequency re-use patterns are well studied and often involve directionality of the antenna (401, 402) in the horizontal direction as indicated in FIG. 1 (104a, 104b, 104c) and also indicated in FIG. 2 (201, 202, 203), in addition to simple frequency diversity as represented in FIG. 4 (401a, 401b, 402a, 402b).

The simplified situation depicted in FIG. 4 has been replicated in two dimensions across populated areas in the world today such that there are large regions and even whole countries where there is essentially continuous coverage zone or layer (421) near the ground where under most open-air conditions, reliable communications can be conducted between a mobile device and the cellular system and then subsequent end points connected to the cellular system (such as the public switched telephone network, other mobile devices or computer systems exchanging datagrams with the mobile devices on the cellular network). FIG. 5 is a so-called coverage map of the United States, where the blue regions are areas where there is continuous coverage of a cellular-type network capable of carrying either voice or datagram traffic to and from mobile devices located near the ground, and the white regions are areas where there is no coverage. As is evident by simple inspection, a majority of the United States is covered.

Presently, there is great interest in the deployment of unmanned aerial vehicles (hereafter, UAVs) and remotely piloted vehicles (hereafter, RPVs) for commercial activities. The interests include functions as varied as package delivery within a neighborhood from a local distribution warehouse to remote sensing of 1000's of miles of oil pipelines to check for leaks or right-of-way incursions.

For the purposes of discussion herein but without loss of generality and understanding that there may be substantial cross-over between categories, UAVs will be considered short range and low altitude aerial vehicles under 50 pounds in weight which fly under 2000 feet above ground level (AGL) and/or below legally controlled airspace, and may or may not have a remote operator actively guiding the UAV over part or all of a course of flight, where the remainder of the course of flight may be autonomously guided; RPVs will be considered long range and higher altitude longer range aerial vehicles above 50 pounds in weight, with typical normal-course flight altitudes above 2000 feet AGL and/or within legally controlled airspace, and always have a human remotely piloting and/or monitoring the vehicle, with allowances for automation of normal course flight such as the use of an autopilot as is customary in manned aerial vehicles.

A typical UAV and a typical RPV are shown in FIGS. 6 and 7 respectively. UAVs and RPVs were developed originally for primarily military reasons, and as such the communications with them principally made use of military line-of-sight communications methods for UAVs, and military satellite networks for RPVs. An example of the communication network configuration for many present-day military RPVs is shown in FIG. 8, which shows that the UAV/RPV communicates firstly exclusively with dedicated satellites above it (801) in the indicated military application, which then relay communications to a command center (810). In fact, as shown in FIG. 9, the nose of the RPV shown in FIG. 7 is dedicated largely to a high gain tracking antenna which communicates with satellites orbiting above the RPV, at between 650 and 22,500 miles overhead. The path losses associated with communicating with a transceiver or transponder at such distances necessitate high gain antennas as indicated in FIG. 9 (901).

In order for RPVs, and to some extent UAVs, to be useful for commercial activities, in most jurisdictions they must comply with laws and regulations governing the use of controlled airspace. Generally such compliance requires that the UAV/RPV be able to communicate with air traffic controllers and also see and avoid other air traffic. Thus in addition to any real-time datagrams that are required by the commercial activity to be sent between the UAV/RPV and its operations center, the RPV must maintain constant communications with its operations center to transmit images from the RPV and communications between the RPV and air traffic control centers, so that the RPV can act and be directed as though it were itself a manned aerial vehicle.

The need for constant communications puts significant demands on the communications link to the orbiting satellites. Besides the difficulties with communications over such distances (650 to 22,500 miles), there are limited satellites available, each with limited bandwidth, and they are insufficient in number and available operating bandwidth to accommodate significant commercial activities via RPVs and UAVs. In addition, smaller RPVs and UAVs do not have the room or payload capability for the antenna systems necessary for the RPV or UAV to communicate to satellites. In addition, there is little or no redundancy of the satellites and if a satellite transponder fails and/or the communications via that satellite is compromised, then all communications with the RPV/UAV may be lost, and subsequently control for the RPV/UAV may be lost.

SUMMARY OF THE INVENTION

The present invention provides a system, method and components for managing and operating reliable communications with a wide variety of RPVs and UAVs. Embodiments of the system are configured to provide redundant coverage especially over populated areas where the operation of, and communications with, the RPV/UAV are especially important for safety reasons. The present invention is an improvement to the currently limited modern cellular data and voice network which is currently limited to near-ground operations.

According to some preferred embodiments, a cellular type communications system is provided. The system is configured to provide a first near-ground region to communicate with devices near the ground. Additional layers, such as, for example, one or more second layers are provided covering roughly the same areal extent as the first near-ground region but which are separated from each other, and which also are elevated above ground substantially. The system is configured to provide the second or additional elevated region or layer to serve as a region within which an aerial vehicle may rely on communications using the cell-based communications network. The cellular based network therefore handles near-ground communications through the first near-ground region, and skyward communications through the second or elevated region or regions. The levels preferably are separated from one another, which may be physically through the use of barriers, such as, for example, passive reflectors. Additionally, or alternatively, the communications transceivers, that is those of near-ground devices, and those of aerial vehicles, such as RPVs and UAVs, may be configured to operate using different protocols, so that in the event communications within the second region are attempted using a near-ground device, they will not affect the operation of the second level aerial region communications. For example, a skyward communications protocol may be differentiated from the along-ground communications protocol in order to uniquely identify UAV and RPV transceivers from along-ground cell phones and smartphones and the like.

In order to carry out preferred embodiments of the invention, the present system may be configured by deploying an antenna system mounted on an existing cellular network base station fixed transceiver antenna mount. The antenna system preferably is a skyward antenna system and is configured to radiate radio frequency energy skyward. According to preferred embodiments, the radiation frequency is propagated over some subtended angle in a cone or other shape. According to some embodiments, the antenna system may be connected to a second set of transceiver equipment similar or identical to existing cellular network equipment and effectuates communications with vehicles in the air (e.g., UAVs and RPVs) instead of along the ground.

According to preferred embodiments, the skyward signal propagated by the skyward pointing antennas are polarized, and preferably, horizontally or circularly polarized. According to some preferred embodiments, two sets of signals are radiated skyward of differing sets of frequencies, where the angles subtended by the radiation pattern differ in order to effectuate continuous communications coverage for differing elevation bands above the antenna. For example, a first angle of a radiation pattern may extend skyward and represent a region of frequencies for which a first type of skyward vehicle is configured to communicate using. This may be for UAVs, which typically are operated at lower levels compared with some RPVs. In this example, a second frequency region may be provided through a second radiation pattern having a different subtended angle, which may provide a region for RPV communications. The differing elevation bands may represent second layers of the skyward region.

According to some embodiments, the skyward signal propagated by the skyward pointing antennas may be polarized in accordance with preferred polarization. For example, the upper radiation propagation from a skyward antenna may be configured to direct radiation in a pattern, such as, for example, in a shape, like a cone. Signal isolation may be implemented in connection with the embodiments of the system and communicating devices to enhance the quality of the communications, and thereby eliminate or reduce the potential for unintentional interaction between signals of differing frequencies, or bands of frequencies. Embodiments may provide isolation of the signals using diverse frequencies (e.g., certain frequencies for UAVs versus other frequencies for RPVs). In addition to frequency diversity, signals also may be isolated by polarization patterns. According to a preferred embodiment, polarization may include right-hand circular polarization and left-hand circular polarization. For example, one skyward cone (e.g., a lower layer) may have right-hand circular polarization of the propagated signals, while another skyward cone (e.g., a higher level layer) may have left-hand circular polarization of the propagated signals. According to some embodiments, the system, method and devices may further provide polarization patterns for UAV and RPV transmitting and receiving, as well as the base station. For example, corresponding polarization patterns may be implemented for transmission and reception between communicating components, such as transceivers.

The skyward radiation energy preferably may be emitted as a pattern, and the skyward pointing radiation pattern, according to some preferred embodiments, is electronically created and controlled. According to some preferred embodiments, the skyward pointing radiation pattern may be electronically steered to follow a specific UAV or RPV.

The energy radiated for a given skyward pattern may be limited to assist in providing separation between bands of aerial vehicle continuous communications regions.

According to some additional embodiments, further methods and configurations may be implemented to differentiate the UAV and RPV type vehicles (and their communications) from ground-based cellular devices. UAV and RPV transceivers may be configured to have unique or differentiated identification numbers or classes of IMEIs (international mobile equipment identity numbers) enabling rapid differentiation by the cellular communications network between RPV and UAV communications and along-ground communications. The system may be configured to take any action thereupon, such as special routing of the datagrams or voice traffic.

The systems may incorporate and include processing components, such as, for example, processors, microprocessors, and circuits and software with instructions for processing communications from communicating equipment and transceivers carried or associated therewith. The software may be stored on a suitable storage component, such as flash memory, hard disk storage, or other suitable media, and include instructions for carrying out the steps for implementing the communications over the first or near-ground zone level and second levels where aerial communications with aerial vehicles take place.

These and other advantages of the invention are described herein and illustrated in connection with the illustrated embodiments.

BRIEF DESCRIPTION OF THE DRAWING FIGURES

DETAILED DESCRIPTION OF THE INVENTION

This invention pertains to the use of some parts of the existing installed base of cellular networks presently serving most of the world's population along the ground, as the backbone of a system for servicing the communications and datagram exchange needs of emerging commercial UAV and RPV activities in the air.

Figure 1:
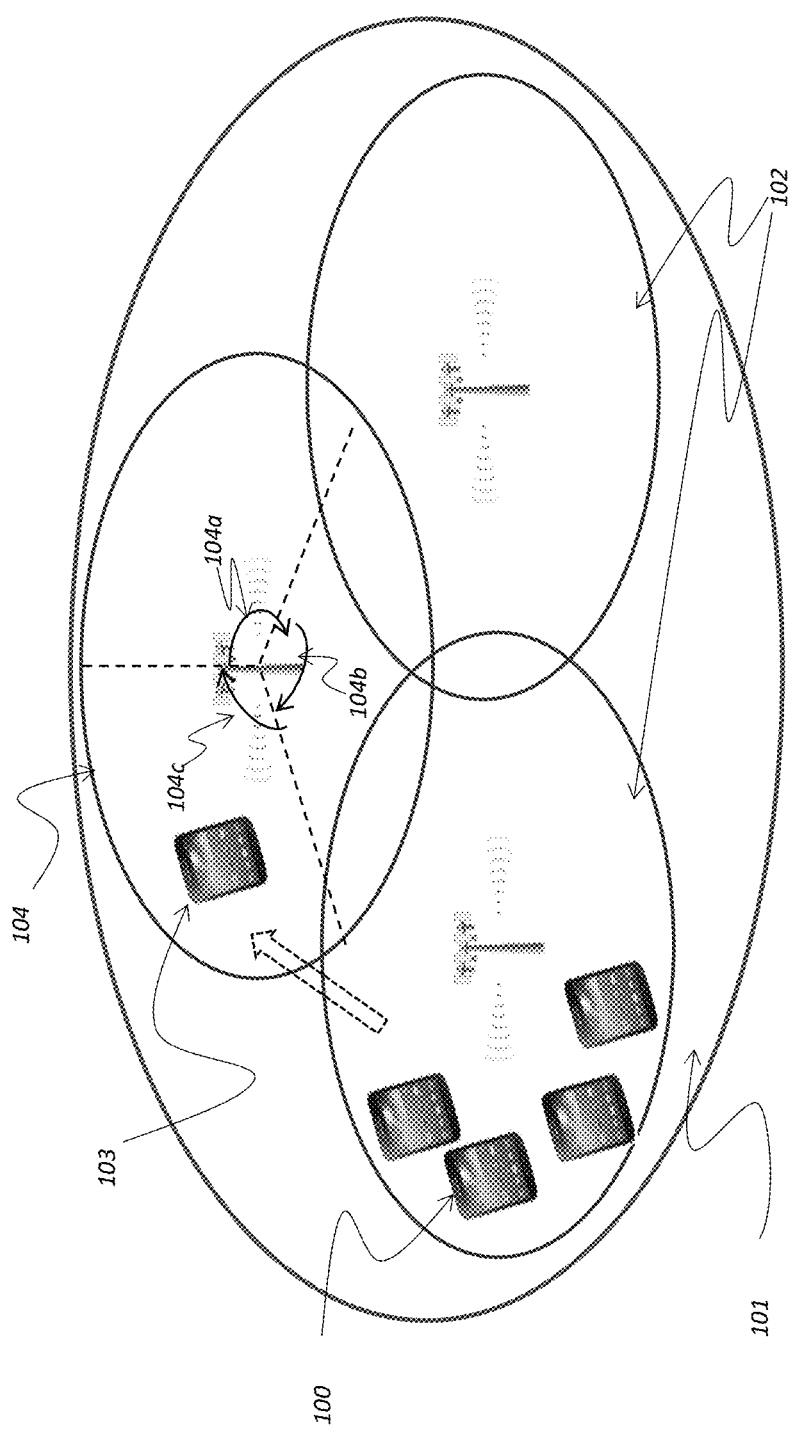
FIG. 1 is a schematic illustration representing a "cell" based wireless system for general public communications used today.
Figure 2:
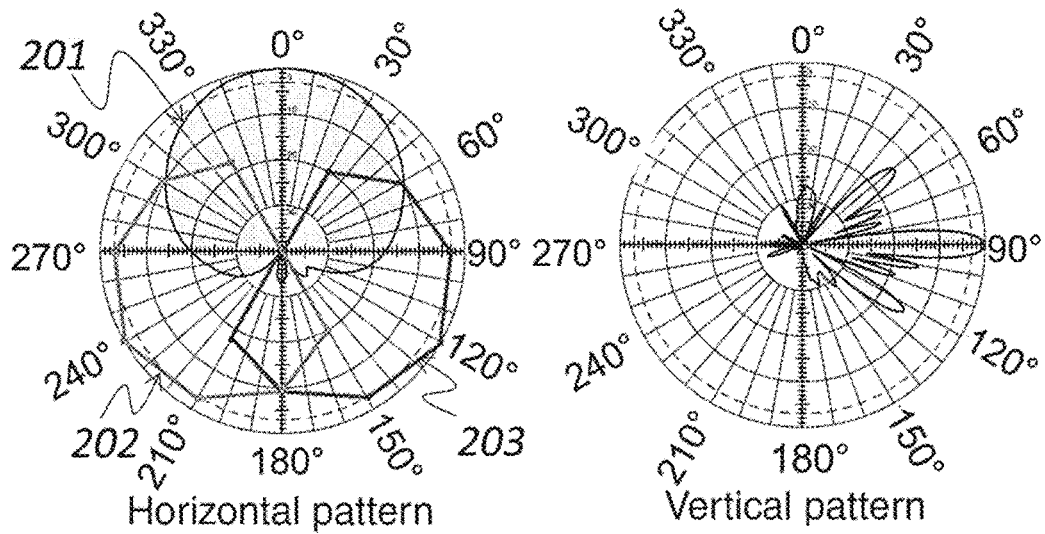
FIG. 2 is a diagram of a radiation pattern of a typical fixed radio transceiver in a cellular-based wireless communications system.
Figure 3:
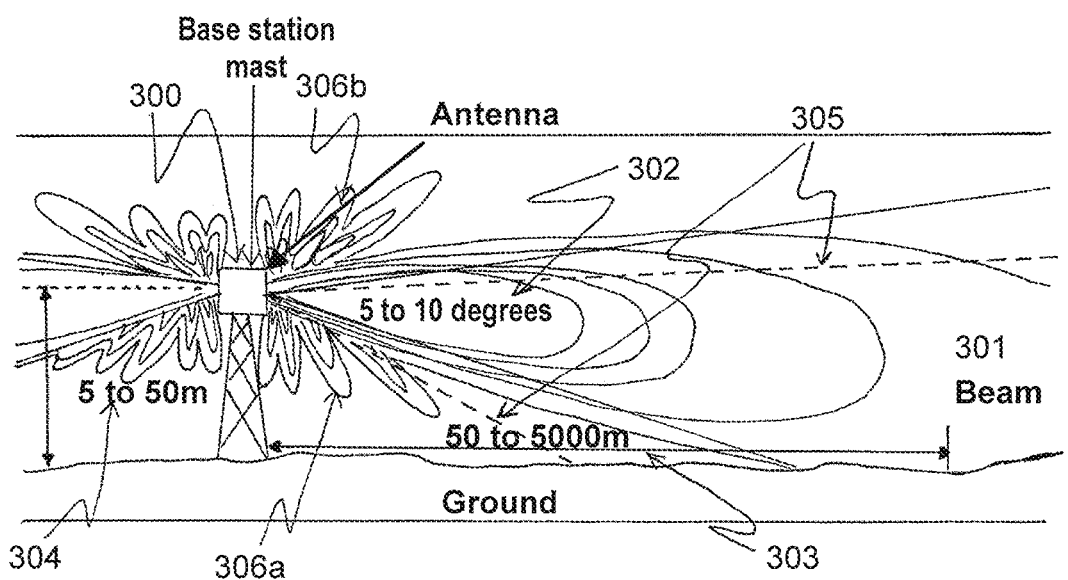
FIG. 3 is a pictorial diagram illustrating a base station and antenna in a fixed transceiver antenna system showing a visualized representation of a vertical radiation pattern.
Figure 4:
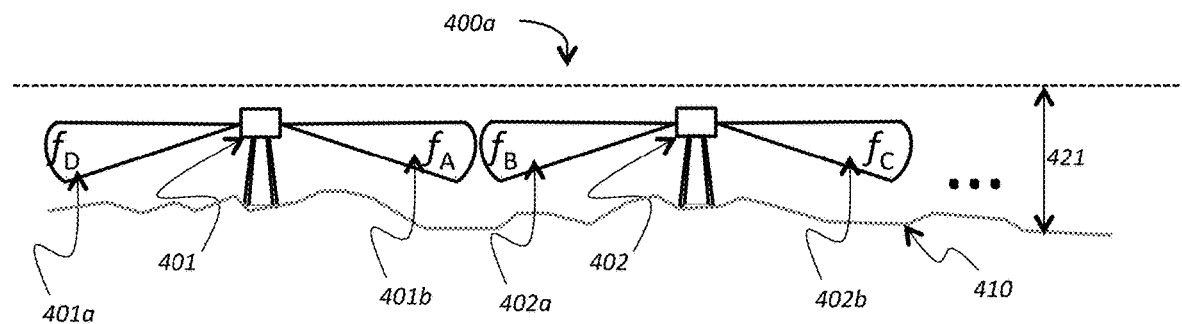
FIG. 4 is a diagram showing a plurality of the fixed radio transceiver antenna of FIG. 3, shown spaced apart from each other and illustrating respective radiation patterns.
Figure 5:
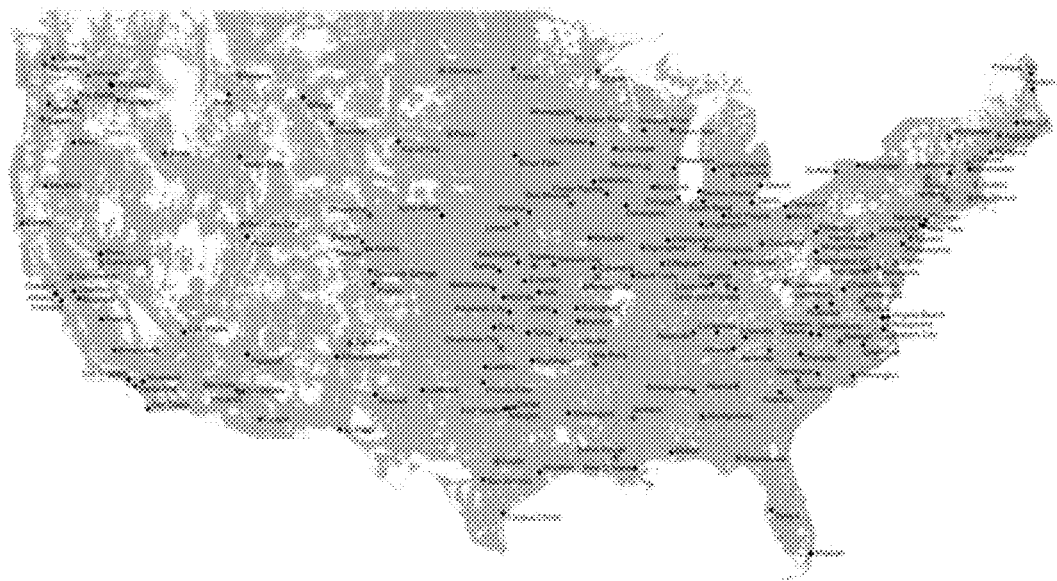
FIG. 5 is a depiction of a coverage map of the United States, illustrating regions of coverage for a cellular-type network capable of carrying either voice or datagram traffic to and from mobile devices located near the ground.
Figure 6:
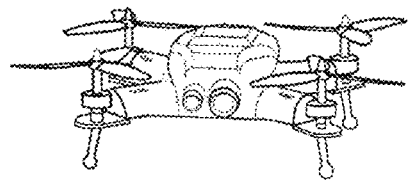
FIG. 6 is an illustration depicting an example of an unmanned aerial vehicle (UAV).
Figure 7:
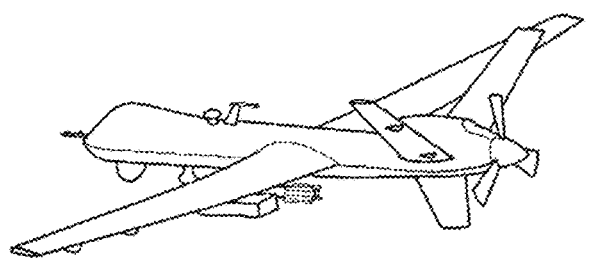
FIG. 7 is an illustration depicting an example of a remote piloted vehicle (RPV).
Figure 8:
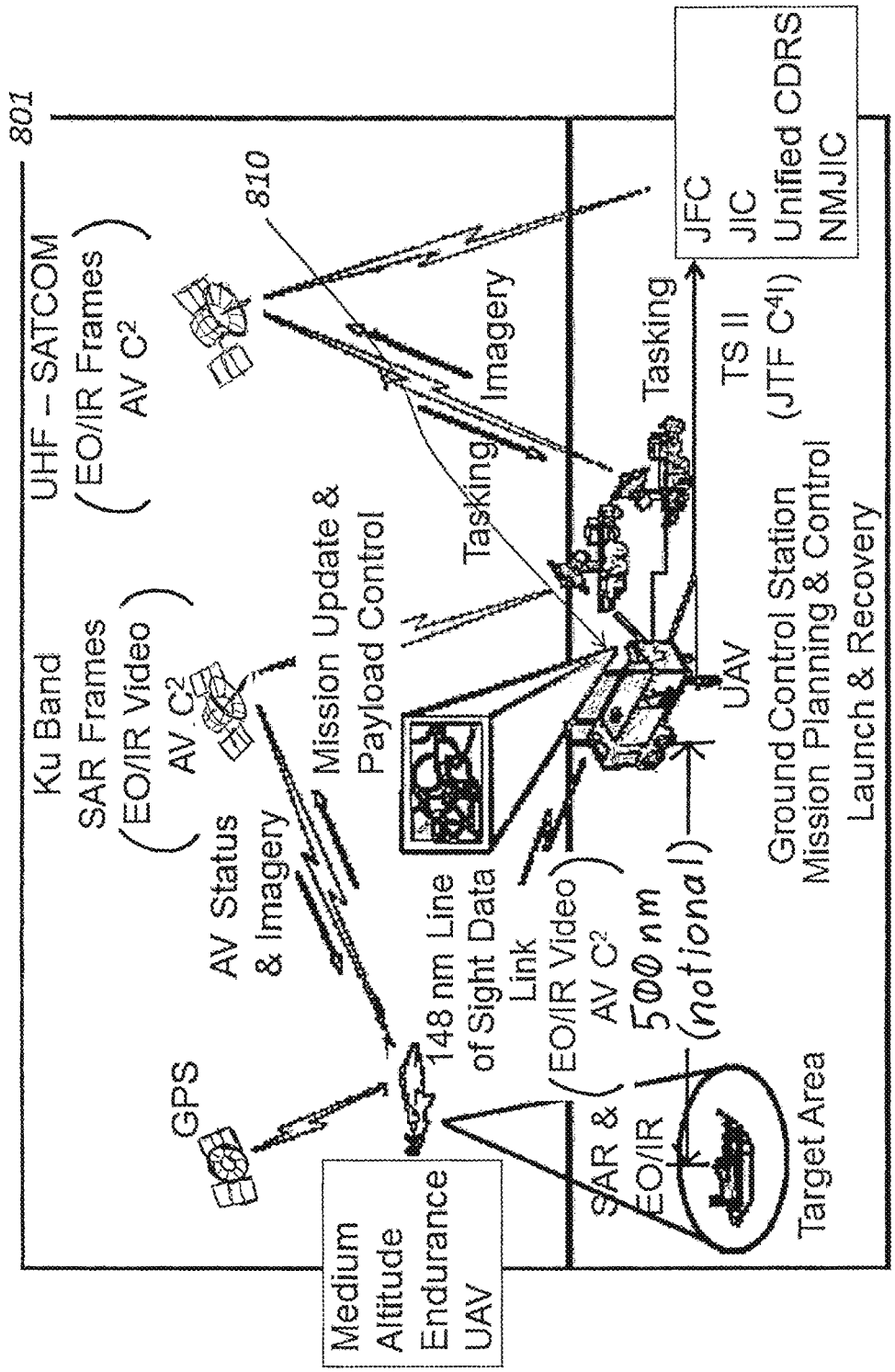
FIG. 8 is a schematic diagram illustrating a typical UAV/RPV military communication network.
Figure 9:
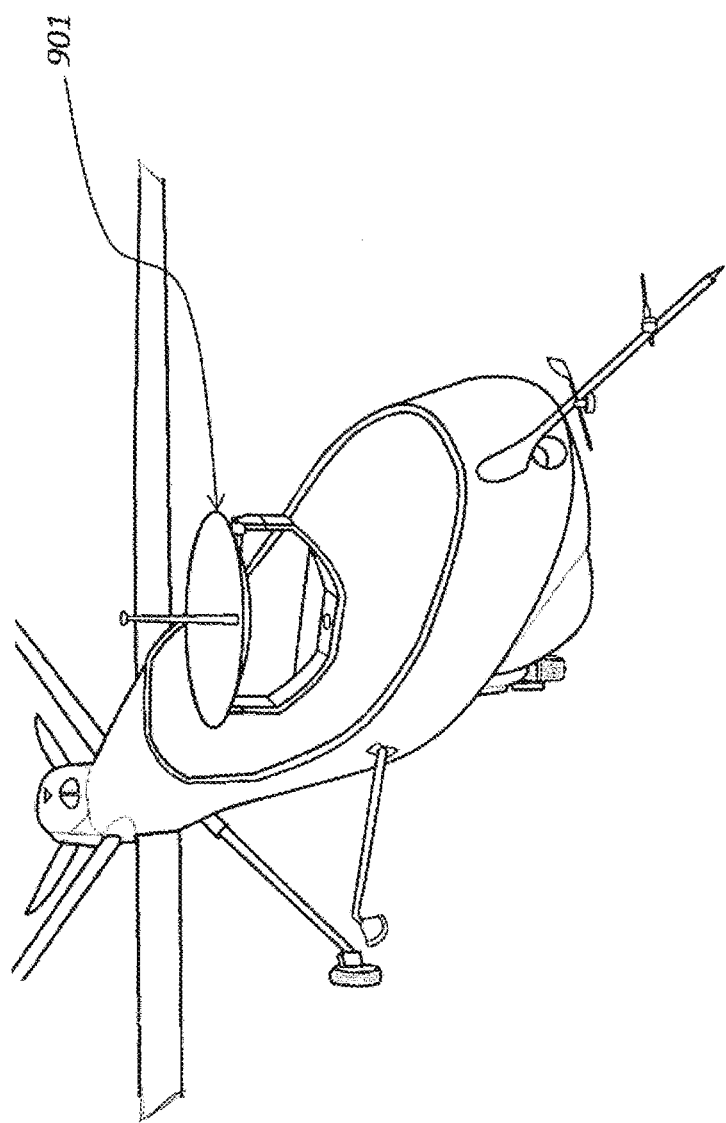
FIG. 9 is an illustration depicting an example of a remote piloted vehicle (RPV) satellite communications antenna.
Figure 10:
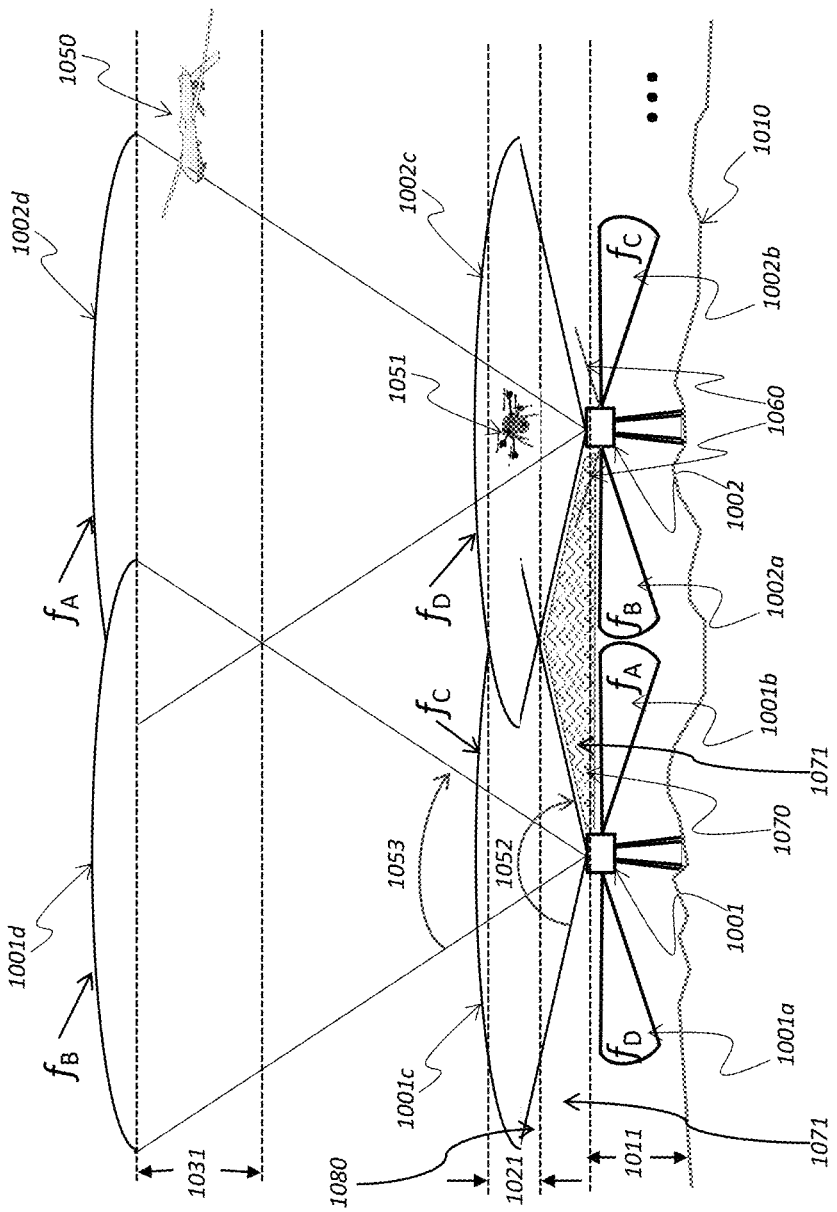
FIG. 10 is an illustration of a preferred embodiment depicting a system for communicating with UAVs and RPVs.

In a preferred embodiment, referring to FIG. 10, new antennas are mounted on one or more existing cellular network towers (1001, 1002) however pointing skyward instead of along-ground, and with either horizontal or right- or left-circularly polarized radiation patterns, and which nominally radiate upwards in a cone shape subtending some angle (1052), though any other shape is possible. The shape of the upward radiation pattern may be electronically steered or controlled. It may also be isolated further from ground radiation patterns by passive shield or screens (1060), further minimizing the effect of side-lobes from the ground-oriented radiation patterns on aerial transceivers, and vice versa.

The radiated area in which sufficient link margin is available for successful communications between the fixed location transceivers and the UAVs or RPVs (1001c, 1002c) is created by designing both the shape of the radiation pattern in conjunction with the power of each transceiver (both those on the UAV/RPV as well as that associated with the fixed location transceiver) in any number of manners well known by those practiced in the art, including commercially available software. When further considering the distance to other fixed location transceivers, an overlap region can be easily designed which produces an elevated layer (1021) in which an aerial vehicle can be assured of having both no black-out regions (1080), as well as sufficient link margin to insure reliable communications.

In addition, in one embodiment, a second (or third or fourth, and so on) set of cones of skyward radiating patterns may be built, with different subtended angles (1053) and different polarizations and/or powers for each transceiver pair, such that another layer (1031) of continuous coverage over some larger region is created at a different elevation. Although an aerial vehicle could enter airspace where it was operating below a contiguous communications layer and still obtain a signal from a specific fixed antenna, for example at point (1070), if it continued at the same elevation and arrived at point (1071), it would be actually outside of the higher altitude signal cones (1001d, 1002d), but beyond sufficient link margin to obtain reliable communications links via lower altitude signal cones (1001c, 1002c), and thus would likely lose communications. According to some preferred embodiments, sets of skyward cones may have polarizations different polarizations of other sets of skyward cones. The polarization also may be configured to correspond with polarizations of receiving and transmitting transceivers of communicating components (e.g., UAVs and RPVs). For example, one set of cones may be configured with right-hand circular polarization and another set of skyward cones may be configured with left-hand circular polarization. These configurations may provide increased isolation of the signals, in addition to any isolation provided by the frequency diversity (e.g., between cone sets). For example, according to some preferred embodiments, a first set of skyward signals may be polarized in a first polarization pattern and a second set of skyward signals may be polarized in a second polarization pattern. According to some preferred embodiments, the polarization patterns may be circular patterns. According to an exemplary embodiment, one set of skyward signals may be polarized in a right-hand circular polarization pattern and another set, such as a second set, of skyward signals may be polarized in a left-hand circular polarization pattern. Each set of skyward signals may be configured to form a shape, such as, for example, a cone. According to an exemplary embodiment, the system may be configured to communicate where a first set of skyward signals forms a first skyward cone, and where a second set of skyward signals forms a second skyward cone. The first and second sets of signals preferably have different polarizations to further isolate the first set from other signal sets. For example, the first skyward cone may be polarized in a right-hand circular polarization pattern, and the second skyward cone may be polarized in a left-hand circular polarization pattern. Skyward pointing antennas may be used to radiate sets of signals of differing frequencies, and where each signal set has a different frequency. The skyward radiation patterns preferably are electronically created. According to preferred embodiments, the unmanned aerial vehicle (UAV) or remote piloted vehicle (RPV) may be configured with a transceiver that communicates through a polarized signal pattern similar to the polarized signal pattern of communications from the network and radiated from the skyward pointing antennas having the communicating frequency. For example, the skyward pointing radiation pattern may be electronically steered to follow a specific unmanned aerial vehicle (UAV) or remote piloted vehicle (RPV). In addition, according to an exemplary embodiment, one skyward signal cone may be an upper layer and another skyward cone may be a lower layer. Each of the layers preferably has a different polarization pattern. For example, the first or upper skyward layer may have a left-hand circular polarization pattern of radiation and the second or lower skyward layer may have a right-hand circular polarization pattern of radiation. The radiation energy for each layer is configured to have different frequencies for each layer or cone. In this exemplary embodiment, the RPV communication takes place within the first or upper layer (e.g., the first skyward cone), and the UAV communication takes place within the second or lower layer (e.g., second skyward cone). The UAV in this example has a transceiver configured for transmitting and receiving, and more particularly, the UAV transceiver is configured to transmit and receive signals in a right-hand circular polarization pattern. The RPV, according to this example, has a transceiver configured for transmitting and receiving, and more particularly, the RPV transceiver is configured to transmit and receive signals in a left-hand circular polarization pattern. The cellular network base station preferably has a transceiver that is configured to transmit and receive signals in a polarization pattern (and frequently) that matches the pattern of the communicating transceiver (such as a transceiver of a UAV or RPV), which, according to some preferred embodiments, may be a right-hand circular polarization pattern or a left-hand circular polarization pattern.

By electronically controlling the beam angle (1052, 1053) and power which the fixed location transceivers (1001, 1002) deliver into the skyward pointing antenna systems, in any of a number of manners well known to those practiced in the art, the altitude and thickness of the continuous communications layers can be adjusted. This adjustment capability enables the continuous communication layer to follow either a certain elevation above ground level or a certain elevation above mean sea level. Aircraft altitudes are often controlled by measurement of altitude via barometric pressure and UAVs and RPVs may be directed by local air traffic controllers or regulations in a similar manner. The layer can be adjusted in elevation above ground level or mean sea level as often as desired, even minute-by-minute, according to any parameter necessary.

By way of example, the lower altitude continuous communications layer (1021) might be controlled to range from 500 feet above ground level to 2000 feet above ground level. The higher altitude continuous communications layer (1031) might be controlled to range from 20,000 feet above mean sea level to 25,000 feet above mean sea level.

When a UAV as indicated (1051) is operating in a lower continuous communications layer travels through the cone of coverage directed at a higher communications layer, the receiver in the UAV (1051) is many times closer to the transmitter (1002) than the high altitude RPV (1050). However, in most commercial application situations, the smaller UAV (1051) would have a lower gain receiving antenna compared to the larger RPV (1050) and thus the received signal power in the UAV (1051) from the radiated power in the higher altitude directed cone (1002d) can be less than that received by the UAV (1051) from the radiated power in the lower altitude directed cone (1002c). Put another way, the available gain from a ground-pointing antenna which is able to be deployed in the RPV (1050) can more than make up for any signal loss from its extra distance, and therefore it is possible in many configurations for the higher altitude directed beam (1002d) emanating from the ground antenna (1002) to be considerably lower field strength at UAV (1051) than the field strength from the lower altitude directed beam (1002c) at UAV (1051).

While the frequency diversity indicated in FIG. 10 only makes use of 4 frequency groups ($f_A$, $f_B$, $f_C$, $f_D$), it is easily recognized by those practiced in the art of cellular system design that many more arrangements are possible without departing from the scope of the invention.

It can also be recognized by those practiced in the art that the link margins between the fixed ground transceivers (1001, 1002) and UAVs (1051) and RPVS (1050) operating in communications layers (1021) and (1031) respectively can be more tightly constrained than the link margins between the fixed ground transceivers and typical personal mobile devices and smart phones transceiving via along-ground links (1001a, 1001b, 1002a, 1002b). This is because unlike a mobile phone which may be in a drawer, in a person's pocket or deep inside a building in a big city with multi-path, fading and difficult signal attenuation conditions which must be accommodated, the attenuation of the UAV-to-Fixed-Ground-Transceiver link or the RPV-to-Fixed-Ground-Transceiver link would in most situations be dominated simply by path loss.

In addition to the creation of one or more continuous communication layers with the attendant addition of frequency diversity considerations in the skyward beams, customary cellular system protocols, such as those employed in GSM, 3G, 4G or LTE signaling and link management protocols can include special identification of signals directed to or coming from UAVs or RPVs. Such an adjustment to the protocols can be as simple as a specialized IMEI class of numbers. By quickly enabling the identification of the class of subscriber on the mobile network as UAV or RPV versus a mobile device primarily intended for along-ground use (such as a personal cell phone or smartphone), the system can eliminate connecting to (for example) a person who accidentally left their personal cell phone on while taking a commercial flight.

These and other advantages may be realized with the present invention. While the invention has been described with reference to specific embodiments, the description is illustrative and is not to be construed as limiting the scope of the invention. For example, while FIG. 10 illustrates network towers 1001, 1002, a plurality of network towers may be utilized in conjunction with the system, methods and components shown and described herein. For example, the skyward pointing antennas may be connected to existing network equipment. In this alternate implementation, the network equipment is configured to treat the skyward pointing antenna or antennas as an additional cell zone. Also, the radiation shape or pattern according to some preferred embodiments is described as a cone, but may be configured to have other shapes. According to some embodiments, the skyward antennas may be configured to operate with an additional set of network equipment or component thereof. Various modifications and changes may occur to those skilled in the art without departing from the spirit and scope of the invention described herein and as defined by the appended claims.

What is claimed is:

1. A cellular type communications system comprising: a first near-ground layer configured to communicate with cellular devices near the ground, said first near-ground layer comprising a first areal zone; at least one second layer configured to cover a substantially similar areal extent as said first areal zone, wherein said second layer comprises an elevated areal zone, wherein said second layer elevated areal zone is separated from said first areal zone, and wherein said second layer elevated areal zone is elevated substantially above ground, wherein said second layer is configured to communicate and within which an aerial vehicle may rely on communications using the cell-based communications network;
   a cellular network base station including transceiver equipment; at least one antenna system being configured to radiate radio frequency energy skyward; wherein said transceiver equipment comprises components configured for effectuating communications in said near-ground layer and components configured for effectuating communications in said second areal zone;
   a cellular network base station fixed transceiver antenna mount; wherein said transceiver equipment components comprise first transceiver equipment for effectuating communications in said near-ground layer and second transceiver equipment for effectuating communications with vehicles in the air within said second areal zone; said at least one antenna system comprising at least one antenna mounted on said cellular network base station fixed transceiver antenna mount, wherein said antenna system is configured to radiate radio frequency energy skyward over some subtended angle in a cone or other shape; said antenna system being connected to said second transceiver equipment;
   wherein said second antenna system comprises one or more skyward pointing antennas;
   wherein said one or more skyward pointing antennas propagates a signal in said second areal zone;
   wherein said one or more skyward pointing antennas propagates a skyward signal, and wherein said skyward signal is polarized;
   wherein two sets of skyward signals are radiated skyward of differing sets of frequencies, where the angles subtended by the radiation pattern differ in order to effectuate continuous communications coverage for differing elevation bands above said one or more skyward pointing antennas; and
   wherein the signal propagated for said second areal zone second layer has a lower field strength than the field strength of the signal in the first areal zone.

2. The system of claim 1, wherein said skyward signal is horizontally polarized.

3. The system of claim 1, wherein said skyward signal is circularly polarized.

4. The system of claim 1, wherein said one or more skyward pointing antennas radiate said two sets of signals of differing sets of frequencies.

5. The system of claim 1, wherein said one or more skyward pointing antennas propagates signals comprising a skyward radiation pattern, and wherein said skyward radiation pattern is electronically created.

6. The system of claim 5, wherein said skyward pointing radiation pattern is electronically steered to follow a specific unmanned aerial vehicle (UAV) or remote piloted vehicle (RPV).

7. The system of claim 5, including one or more passive reflectors, wherein said cellular network base station fixed transceiver antenna mount and first transceiver equipment for effectuating communications in said near-ground layer generate a ground radiation pattern, and wherein said skyward radiation pattern is further isolated from said ground radiation pattern by said one or more passive reflectors.

8. The system of claim 5, wherein said radio frequency energy radiated from said antenna system for a skyward radiation pattern is limited to assist in providing separation between bands of aerial vehicle continuous communications layers.

9. The system of claim 1, wherein said first set of skyward signals is polarized in a first polarization pattern, and wherein a second set of skyward signals is polarized in a second polarization pattern.

10. The system of claim 9, wherein said polarization patterns are circular patterns.

11. The system of claim 10, wherein said first set of skyward signals is polarized in one of a right hand circular polarization pattern and a left-hand circular polarization pattern, and wherein said second set of skyward signals is polarized in the other of said right-hand circular polarization pattern and said left hand circular polarization pattern.

12. The system of claim 11, wherein said one or more skyward pointing antennas radiate said two sets of signals of differing sets of frequencies.

13. The system of claim 11, wherein said skyward radiation patterns are electronically created.

14. The system of claim 13, wherein said skyward pointing radiation pattern is electronically steered to follow a specific unmanned aerial vehicle (UAV) or remote piloted vehicle (RPV).

15. The system of claim 10, wherein said first set of skyward signals forms a first skyward shape, and wherein said second set of skyward signals forms a second skyward shape, wherein at least one of said first skyward shape and said second skyward shape is polarized in a right-hand circular polarization pattern, and wherein the other of said first skyward shape and said second skyward shape is polarized in a left-hand circular polarization pattern.

16. The system of claim 10, wherein said first set of skyward signals forms a first skyward cone, and wherein said second set of skyward signals forms a second skyward cone, wherein at least one of said first skyward cone and said second skyward cone is polarized in a right-hand circular polarization pattern, and wherein the other of said first skyward cone and said second skyward cone is polarized in a left-hand circular polarization pattern.

17. The system of claim 16, wherein said system is configured for communication with one or more of a UAV and RPV, wherein said first skyward cone is an upper layer and wherein said second skyward cone is a lower layer, wherein said first skyward cone has a left-hand circular polarization pattern of said radiation, and wherein said second skyward cone has a right-hand circular polarization pattern of said radiation, wherein said RPV communication takes place within said first skyward cone, and wherein said UAV communication takes place within said second skyward cone.

18. The system of claim 17, including a UAV, said UAV having a transceiver configured for transmitting and receiving, wherein said UAV transceiver is configured to transmit and receive signals in a right-hand circular polarization pattern.

19. The system of claim 18, including an RPV, said RPV having a transceiver configured for transmitting and receiving, wherein said RPV transceiver is configured to transmit and receive signals in a left-hand circular polarization pattern.

20. The system of claim 19, wherein said cellular network base station transceiver is configured to transmit and receive signals in one or more of a right-hand circular polarization pattern and a left-hand circular polarization pattern.

21. The system of claim 20, wherein said base station transceiver is configured to transmit and receive signals in a right-hand circular polarization pattern when communicating with said UAV, and wherein said base station transceiver is configured to transmit and receive signals in a left-hand circular polarization pattern when communicating with said RPV.

22. The system of claim 17, including an RPV, said RPV having a transceiver configured for transmitting and receiving, wherein said RPV transceiver is configured to transmit and receive signals in a left-hand circular polarization pattern.

* * * * *